(12) United States Patent (10) Patent No.: US 12,595,791 B2
Yakimchuk et al. (45) Date of Patent: Apr. 7, 2026

(54) MULTI-BOLT CLAMSHELL RETAINER FOR WRISTPIN ON ROD PUMP UNIT

(71) Applicant: TRC Services, Inc., The Woodlands, TX (US)

(72) Inventors: Darius J. Yakimchuk, St Albert (CA); Robert G. McDonald, Argyle, TX (US)

(73) Assignee: TRC Services, Inc., The Woodlands, TX (US)

( * ) Notice: Subject to any disclaimer, the term of this patent is extended or adjusted under 35 U.S.C. 154(b) by 459 days.

(21) Appl. No.: 18/100,340

(22) Filed: Jan. 23, 2023

(65) Prior Publication Data

US 2024/0247708 A1 Jul. 25, 2024

(51) Int. Cl.
| | |
|---|---|
| *F04B 47/02* | (2006.01) |
| *F16B 2/06* | (2006.01) |
| *F16B 9/00* | (2006.01) |

(52) U.S. Cl.
CPC .......... *F04B 47/026* (2013.01); *F04B 47/028* (2013.01); *F16B 2/065* (2013.01); *F16B 9/056* (2018.08); *Y10T 403/7067* (2015.01)

(58) Field of Classification Search
CPC .... A63B 21/0728; F04B 47/02; F04B 47/026; F04B 47/028; F16B 2/065; F16B 2/18; F16B 2/185; F16B 9/02; F16B 9/05; F16B 9/056; F16B 7/1418; F16D 1/0864; F16H 37/122; Y10T 403/32893; Y10T 403/32909; Y10T 403/4628; Y10T 403/4674; Y10T 403/4677; Y10T 403/4688; Y10T 403/7067; Y10T 403/7071

USPC .... 403/154, 156, 240, 256, 257, 261, 374.3, 403/374.5
See application file for complete search history.

(56) References Cited

U.S. PATENT DOCUMENTS

| | | | | |
|---|---|---|---|---|
| 2,683,006 | A | * 7/1954 | Nichols | F16B 2/065 |
| | | | | 285/391 |
| 3,789,679 | A | * 2/1974 | Westbrook | F04B 47/02 |
| | | | | 74/41 |
| 4,092,872 | A | 6/1978 | McClure | |
| 4,121,471 | A | 10/1978 | Chancellor | |
| 4,189,251 | A | * 2/1980 | Bianco | F16D 1/06 |
| | | | | 403/373 |

(Continued)

OTHER PUBLICATIONS

American International Manufacturing Corp, Aimco Catalogue, undated, 20-pgs.

(Continued)

*Primary Examiner* — Josh Skroupa
(74) *Attorney, Agent, or Firm* — Cabello Hall Zinda, PLLC

(57) ABSTRACT

An assembly connects a pitman arm to a slot in a crank arm of a pumping unit. A pin extends from the pitman arm disposed on a first side of the crank arm. The pin is disposed in the slot of the crank arm and has a distal end exposed on a second side of the crank arm. The distal end defines an external shouldered profile. A clamp is positioned on the distal end of the pin. The clamp has an internal shouldered profile, which is configured to engage the external shouldered profile on the pin. One or more spacers are disposed on the clamp and are configured to adjustably extend from the clamp toward the second side of the crank arm.

28 Claims, 7 Drawing Sheets

(56) References Cited

U.S. PATENT DOCUMENTS

| | | | | |
|---|---|---|---|---|
| 5,360,157 | A * | 11/1994 | Gilbert | B23K 9/32 |
| | | | | 228/32 |
| 8,075,217 | B2 * | 12/2011 | Eason | F16B 7/0486 |
| | | | | 403/374.5 |
| 9,506,331 | B2 * | 11/2016 | St. Denis | E21B 43/127 |
| 10,215,012 | B2 | 2/2019 | McDonald et al. | |
| 10,215,264 | B2 * | 2/2019 | Ungar | F16D 1/0864 |
| 10,760,386 | B2 * | 9/2020 | Yakimchuk | F04B 47/028 |
| 11,098,708 | B2 | 8/2021 | Schmitt et al. | |
| 11,174,856 | B2 | 11/2021 | Robison et al. | |
| 2016/0201664 | A1 | 7/2016 | Robison et al. | |
| 2019/0330964 | A1 | 10/2019 | Yakimchuk et al. | |
| 2020/0309112 | A1 * | 10/2020 | Yakimchuk | F04B 47/028 |

OTHER PUBLICATIONS

Lufkin, "Conventional & Reverse Mark Pumping Units," Installation Manual CU-09, undated, available from thehistorycenteronline. com page Lufkin Oil Field Equipment Catalogs, Bulletins, Brochures, ca. 1926-2002, 61-pgs.
Weatheford International, "Maximiser III," copyright 2018, pp. 28-34.
Weatherford International, "Ampscot(R) Operator's Manual," Manual, copyright 2015, 47-pgs.
Weatherford International, "Ampscot(TM) Pumping Units," Product Catalog Revision 1.0, copyright 2009, 34 pgs.

* cited by examiner

MULTI-BOLT CLAMSHELL RETAINER FOR WRISTPIN ON ROD PUMP UNIT

BACKGROUND OF THE DISCLOSURE

Reciprocating pump systems, such as sucker rod pump systems, extract fluids from a well and employ a downhole pump connected to a driving source at the surface. A rod string connects the surface driving force to the downhole pump in the well. When operated, the driving source cyclically raises and lowers the downhole pump, and with each stroke, the downhole pump lifts well fluids toward the surface.

For example, FIG. 1 shows a sucker rod pump system 10 used to produce fluid from a well. A downhole pump 14 has a barrel 16 with a standing valve 24 located at the bottom. The standing valve 24 allows fluid to enter from the wellbore, but the standing valve 24 does not allow the fluid to leave. Inside the pump barrel 16, a plunger 20 has a traveling valve 22 located at the top. The traveling valve 22 allows fluid to move from below the plunger 20 to the production tubing 18 above, but the traveling valve 22 does not allow fluid to return from the tubing 18 to the pump barrel 16 below the plunger 20. A driving source (e.g., a pump jack or pumping unit 30) at the surface connects by a rod string 12 to the plunger 20 and moves the plunger 20 up and down cyclically in upstrokes and downstrokes.

During the upstroke, the traveling valve 22 is closed, and any fluid above the plunger 20 in the production tubing 18 is lifted towards the surface. Meanwhile, the standing valve 24 opens and allows fluid to enter the pump barrel 16 from the wellbore.

At the top of stroke, the standing valve 24 closes and holds in the fluid that has entered the pump barrel 16. Furthermore, throughout the upstroke, the weight of the fluid in the production tubing 18 is supported by the traveling valve 22 in the plunger 20 and, therefore, also by the rod string 12, which causes the rod string 12 to stretch. During the downstroke, the traveling valve opens, which results in a rapid decrease in the load on the rod string 12. The movement of the plunger 20 from a transfer point to the bottom of stroke is known as the "fluid stroke" and is a measure of the amount of fluid lifted by the pump 14 on each stroke.

At the surface, the pump unit 30 is driven by a prime mover 40, such as an electric motor or internal combustion engine, mounted on a pedestal above a base 32. Typically, a pump controller 36 monitors, controls, and records the pump unit's operation. Structurally, a Samson post 34 on the base 32 provides a fulcrum on which a walking beam 50 is pivotally supported by a saddle bearing assembly 35.

Output from the motor 40 is transmitted to a gearbox 42, which provides low-speed, high-torque rotation of a crankshaft 43. Both ends of the crankshaft 43 rotate crank arms 44 having counterbalance weights 46. Each crank arm 44 is pivotally connected to a pitman arm 48 by a crank pin bearing 45. In turn, the two pitman arms 48 are connected to an equalizer bar 49, which is pivotally connected to the rear end of the walking beam 50 by an equalizer bearing assembly 55.

A horsehead 52 with an arcuate forward face 54 is mounted to the forward end of the walking beam 50. As is typical, the face 54 may have tracks or grooves for carrying a flexible wire rope bridle 56. At its lower end, the bridle 56 terminates with a carrier bar 58, upon which a polished rod 15 is suspended. The polished rod 15 extends through a packing gland or stuffing box at the wellhead 13. The rod string 12 of sucker rods hangs from the polished rod 15 within the tubing string 18 located within the well casing and extends to the downhole pump 14.

As noted above, bearing assemblies are used to connect the ends of the pitman arms 48 to selective adjustment slots in the crank arms 44. As an example, FIG. 2A shows an isolated view of a bearing assembly 50 connecting a crank arm 44 to a pitman arm 48.

The bearing assembly 50 includes a bearing housing 52, a pitman bearing pedestal 54, a crank or wrist pin 60, a retainer ring 72, and a wrist pin nut 70. The bearing housing 52 and pitman bearing pedestal 54 connect to the end of the pitman arm 48, which is only partially shown here in cross-section.

The wrist pin 60 has an end 62 engaged with bearings 56 in the housing 52. The wrist pin 60 extends from the housing 52 and fits through an adjustment slot 45' in the crank arm 44, which is only partially shown here in cross-section. The wrist pin 60 is tapered, and the wrist pin hole 45' can be split-sleeved or can be bored and tapered with a precision tapered insert. In this example, the wrist pin 60 fits in a sleeve 64 installed in the adjustment slot 45', and a key 66, if used, can engage in a split of the sleeve 64. The wrist pin nut 70 and retainer ring 72 fit on the other side of the crank arm 44, and the wrist pin nut 70 is threaded onto the wrist pin's other end to complete the connection for the bearing assembly 50. A cotter pin (not shown) can be installed in a hole in the end of the wrist pin 60 and can engage a castellation on the nut 70 to prevent the nut 70 from unthreading.

As shown, the conventional wrist pin nut 70 is typically a large threaded nut that has been cast and machined. To install and remove the wristpin nut 70 on the wrist pin's end 68 extending through the crank pin slot 45', operators use an extremely large hammer wrench, making the process hazardous and strenuous. In particular, the crank arm 44 must be positioned so the end 68 of the wristpin 60 on the inside surface of the crank arm 44 can be properly accessed. To install the nut 70, operators thread the nut 70 on by hand, and then operators use the large hammer wrench to tighten the nut 70. When being installed and removed, the threads on the end 68 of the conventional wrist pin 60 are prone to galling. Corrosion can also make the conventional wrist pin nut 70 difficult to remove. For these reasons, the conventional wrist pin nut 70 cannot be reused without having to be re-machined or otherwise reworked.

A conventional multi-jack bolt tensioning nut and washer can also be used for the connection of a wrist pin 60 to a crank arm 44. For example, FIG. 2B shows portion of a bearing assembly having a wrist pin 60 and conventional multi-jack bolt tensioning nut 80 for connecting a crank arm 44 to a pitman arm (48). A washer 82 is installed on the end of the wrist pin 60 extending from the wrist pin hole 45' in the crank arm 44. The nut 80 is screwed on by hand onto the threaded end 68 of the wrist pin 60 until the nut 80 is snug against the washer 82. Smaller jack bolts 84 are threaded on the nut 80 to push against the washer 82 and to pull the wrist pin 60 further through the wrist pin hole 45' so the nut 80 can be tightened more onto the wrist pin 60. To do this, the nut 80 is hand tightened against the washer 82. The jack bolts 84 are then torqued with a ratchet wrench, which pulls the wrist pin 60 further through the wrist pin hole 45' until a gap is present between the nut 80 and the washer 82. The gap is then closed by loosening the jack bolts 84 and repeating the process until required torque values are reached on the jack bolts 84.

In the end, the multi-jack bolt tensioning nut 80 relies on friction to keep the nut 80 from unthreading. Corrosion can make the multi-jack bolt tensioning nut 80 difficult to remove, and galling can also occur on the threads.

What is needed is a wristpin retainer that is simple to install, does not tend to back out, and does not require a hammer wrench to tighten and remove. The subject matter of the present disclosure is directed to overcoming, or at least reducing the effects of, one or more of the problems set forth above.

SUMMARY OF THE DISCLOSURE

An assembly disclosed herein is used for connecting a pitman arm to a slot in a crank arm of a reciprocating pump unit. The crank arm has first and second sides, and the pitman arm is disposed on the first side. The assembly comprises a pin, a clamp, and one or more spacers. The pin extends from the pitman arm and is positioned in the slot of the crank arm. A distal end of the pin extends from the second side of the crank arm, and the distal end defines an external shouldered profile. The clamp is clamped on the distal end of the pin. The clamp has a front face and has an internal shoulder profile. The front face is positioned adjacent to the second side of the crank arm, and the internal shouldered profile is engaged with the external shouldered profile on distal end of the pin. The one or more spacers are positioned adjacent to the front face of the clamp and the second side of the crank arm. The one or more spacers adjust tensioning of the pin relative to the crank arm. The one or more spacers can include one or more washers positioned on the distal end of the pin between the second side of the crank arm and the front face of the clamp. The one or more spacers can include a plurality of bolts adjustably thread in holes extending through the clamp from a back face to the front face.

A kit is also disclosed herein to connect a pitman arm to a slot in a crank arm of a reciprocating pump unit. The kit comprises the pin, the clamp, and the one or more spacers as disclosed above.

A reciprocating pump unit disclosed herein comprises pitman arms, an equalizer bar, a walking beam, and crank arms. The equalizer bar is hingedly connected to the pitman arms, and the walking beam is hingedly connected to the equalizer bar and is mounted to pivot on the reciprocating pump unit. The crank arms are configured to translate the pitman arms. Each of the crank arms having an assembly as disclosed above for connecting the pitman arm to a slot in the crank arm.

A method is disclosed herein to connect a pitman arm to a slot in a crank arm of a reciprocating pump unit. The method comprises: positioning a pin extending from the pitman arm on a first side of the crank arm into the slot in the crank arm; clamping a clamp on a distal end of the pin exposed on a second side of the crank arm by engaging an internal shouldered profile on the clamp to an external shouldered profile on the distal end of the pin; and tensioning the pin relative to the crank arm by selectively adjusting one or more spacers between the second side of the crank arm and the front face of the clamp.

The foregoing summary is not intended to summarize each potential embodiment or every aspect of the present disclosure.

DETAILED DESCRIPTION OF THE DISCLOSURE

Figure 1:
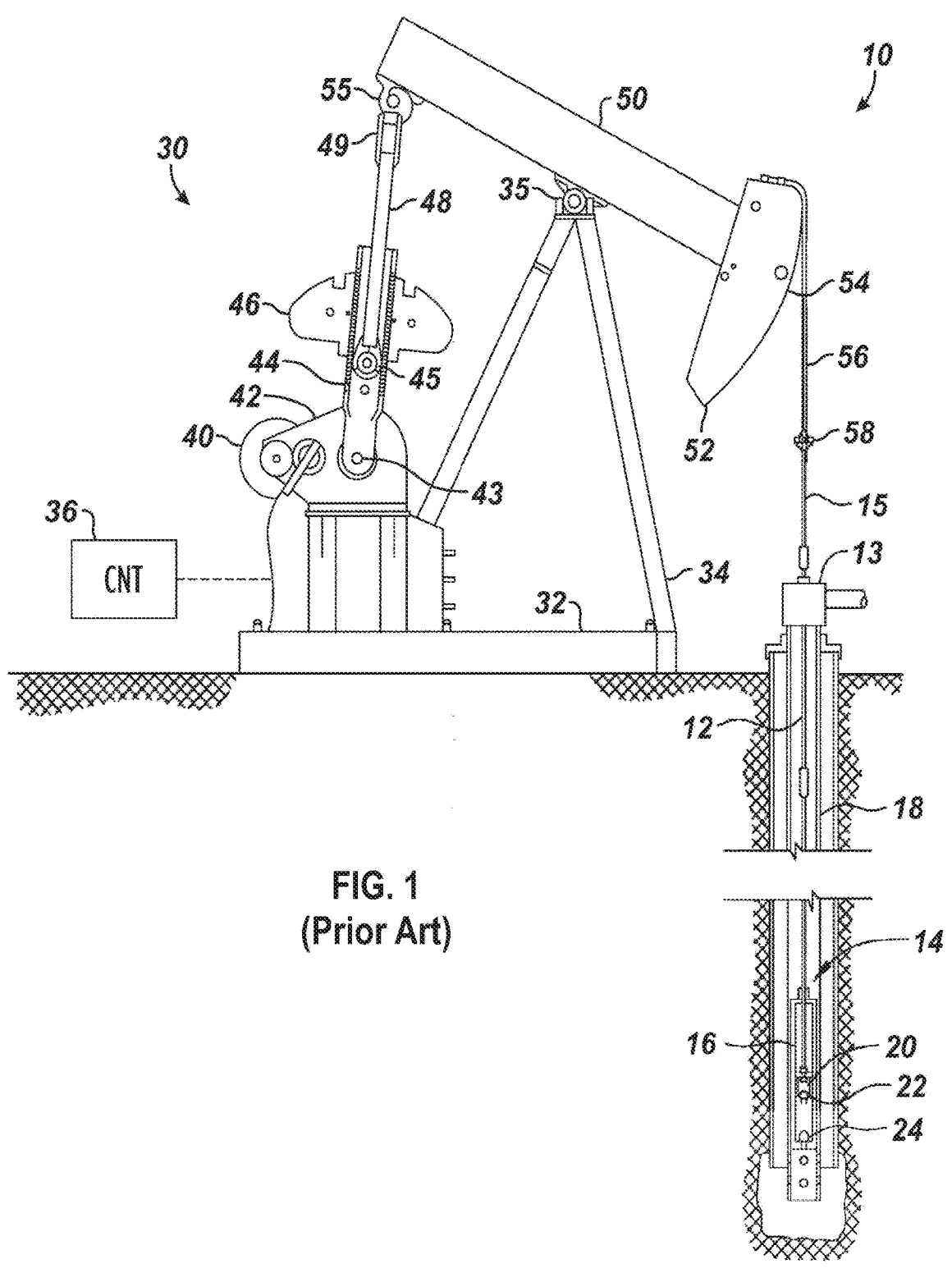
FIG. 1 illustrates an example of a reciprocating rod pump system known in the art.
Figure 2A:
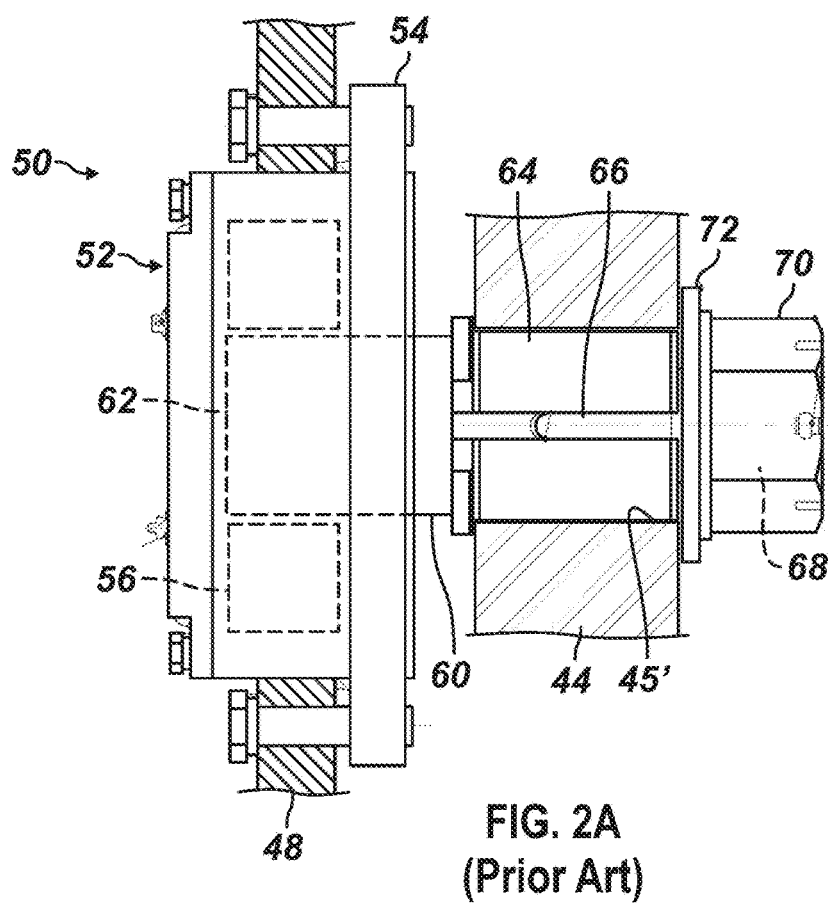
FIG. 2A illustrates an example of a conventional bearing assembly connecting a wrist pin to a crank arm for the reciprocating rod pump.
Figure 2B:
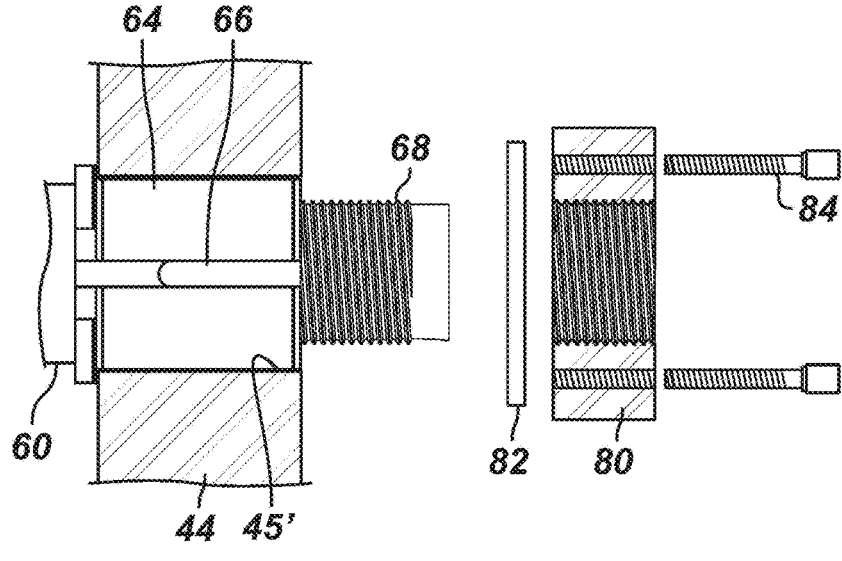
FIG. 2B illustrates a multi-jack blot tensioning nut connecting a wrist pin to a crank arm for the reciprocating rod pump.
Figure 3:
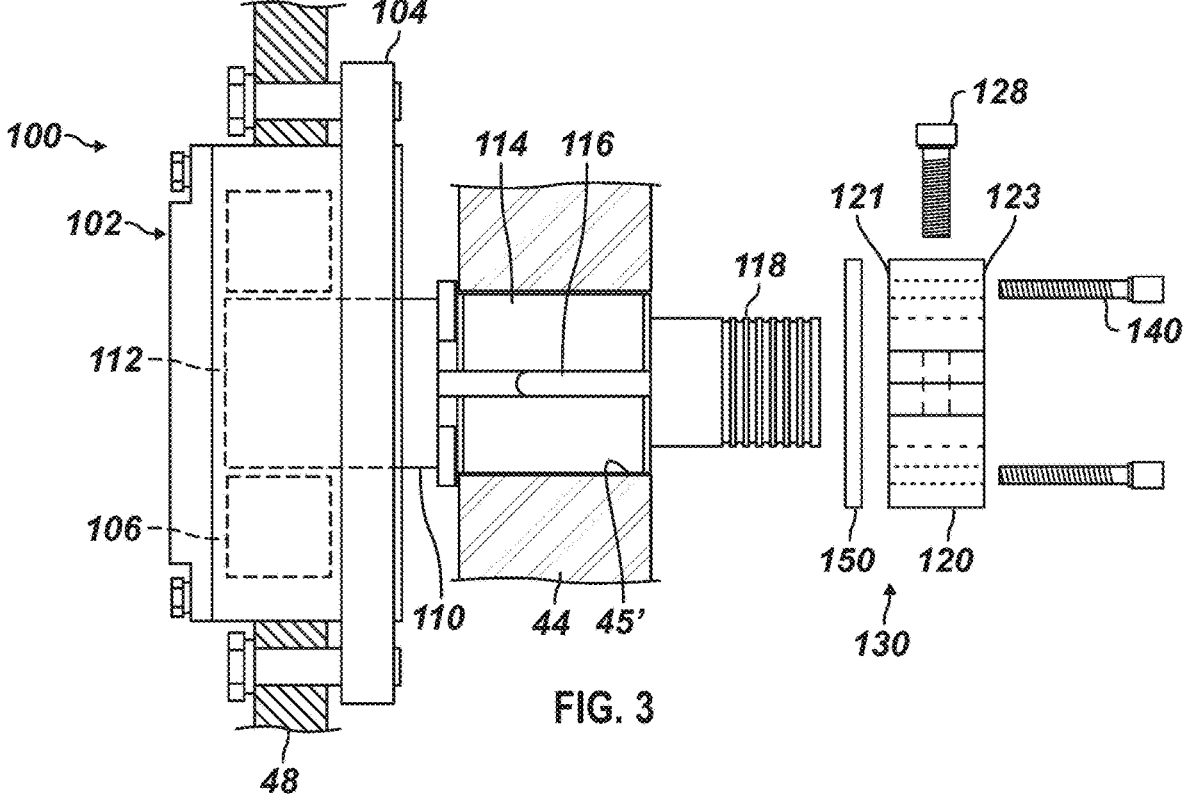
FIG. 3 illustrates a bearing assembly connecting a crank arm to a pitman arm for a reciprocating rod pump having a wrist pin and retainer according to the present disclosure.

As noted above, bearing assemblies are used to connect ends of pitman arms to selective adjustment slots in crank arms. FIG. 3 shows an isolated view of a bearing assembly 100 according to the present disclosure connecting a crank arm 44 to a pitman arm 48 on a sucker rod pump system. As will be appreciated, the disclosed bearing assembly 100 can be used on any suitable sucker rod pump system for producing fluid from a well, such as having a pumping unit as described with reference to FIG. 1.

The bearing assembly 100 can have a number of elements comparable to those discussed previously. For example, the bearing assembly 100 can include a bearing housing 102, a pitman bearing pedestal 104, and a bearing 106. The bearing housing 102 and the pitman bearing pedestal 104 connect to the end of the pitman arm 48, which is only partially shown here in cross-section. A wrist pin 110 has an end 112 engaged with the bearing 106, and the wrist pin 110 extends from the bearing 106 and fits through an adjustment slot 45' in the crank arm 44, which is only partially shown here in cross-section. The wrist pin 110 is tapered, and the wrist pin hole 45' can be split-sleeved or can be bored and tapered with a precision tapered insert. In this example, the wrist pin 110 fits in a sleeve 114 installed in the adjustment slot 45', and a key 116 if present can engage in a split of the sleeve 114.

A retainer 120 and one or more spacers 130 fit on the other side of the crank arm 44, and the retainer 120 affixes to an end 118 of the wrist pin 110. In FIG. 3, the retainer 120 and the one or more spacers 130 are shown disassembled from the wrist pin 110. However, FIGS. 4A-4B show the retainer 120 and spacers 130 engaged on the wrist pin 110 to complete the connection.

In contrast to the conventional wrist pin nut that is typically a large threaded nut, the retainer 120 of the present disclosure is a clamp 120 that clamps onto the end 118 of the wrist pin 110. The clamp 120 has portions that enclose about the end 118 and affix together with a clamping bolt 128. The one or more spacers 130 can include one or more rings or washers 150 that can fit between a front face 121 of the clamp 120 and the side of the crank arm 44. The retainer ring 150 can be a hardened washer. The spacers 130 include tensioning bolts 140 that thread through the clamp 120 from the back face 123 to the front face 121. The distal ends of the tensioning bolts 140 can engage the washer(s) if present or can engage the side of the crank arm 44.

Figure 4A:
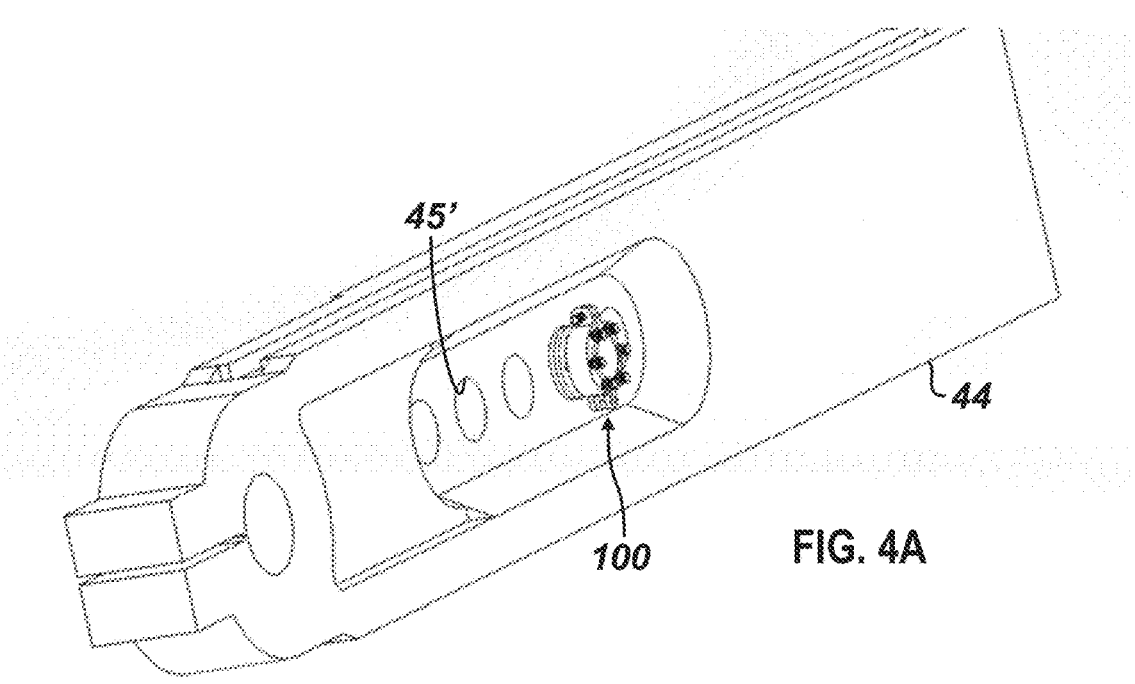
FIGS. 4A-4B illustrate perspective views of the disclosed retainer installed on an end of a wrist pin extending from an opening on a side of a crank arm.
Figure 4B:
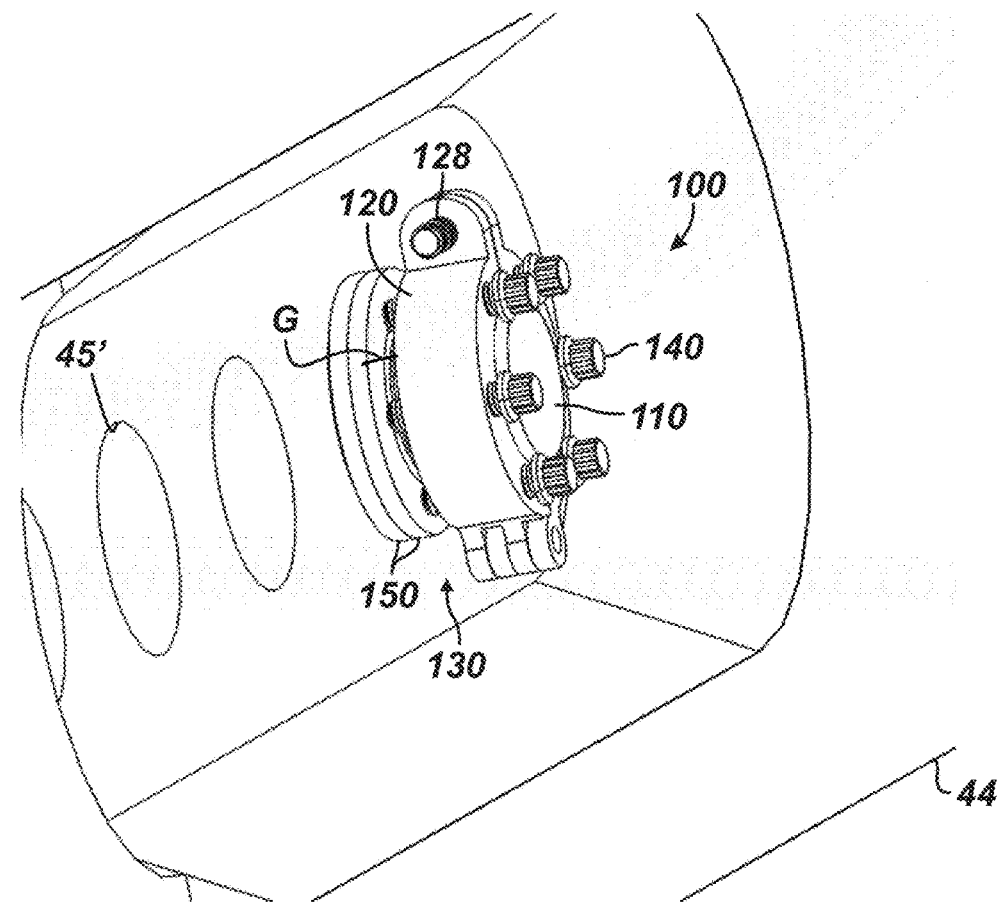
Figure 5:
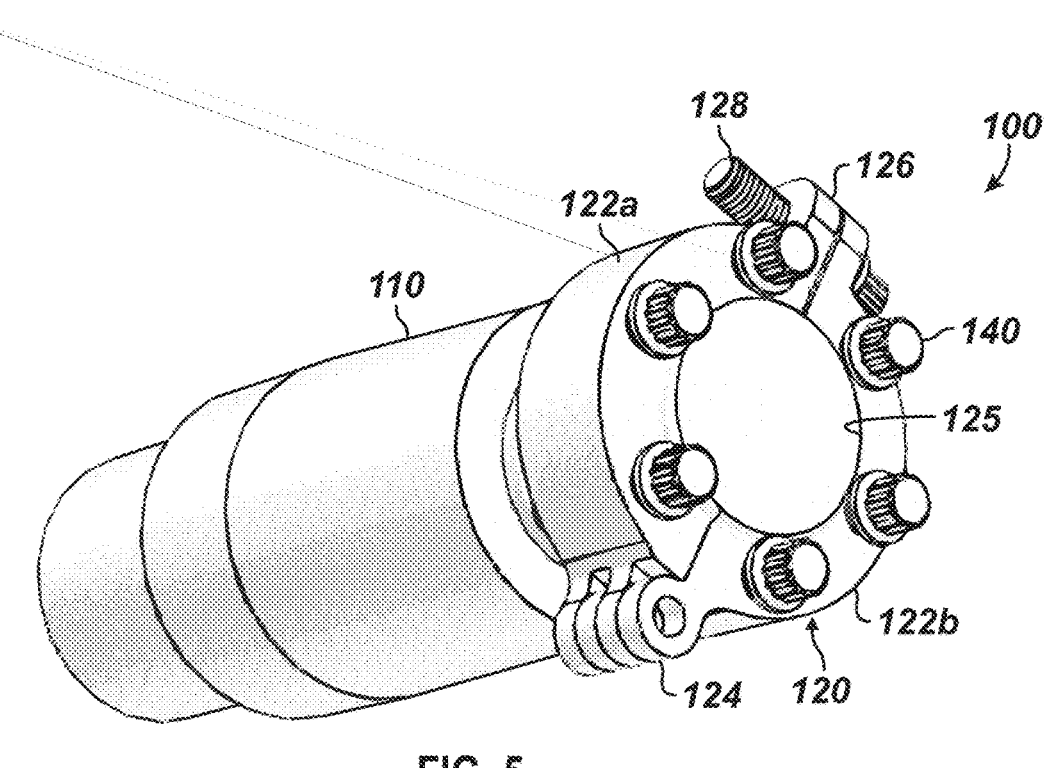
FIG. 5 illustrates an isolated perspective view of the disclosed retainer installed on an end of a wrist pin.

Further details of the retainer 120, the one or more spaces 130, and the wrist pin 110 are shown in FIGS. 4A-4B and 5. FIGS. 4A-4B show perspective views of the retainer 120 and spacers 130 fixed on the end of the wrist pin 110. FIG. 5 shows an isolated view of the wrist pin 110 having the retainer 120 clamped on the end.

As shown, the retainer 120 is a clamp that is positioned on the distal end 118 of the wrist pin 110 by clamping two or more portions 122*a-b* together on the pin 110. The portions 122*a-b* are hinged by one or more hinges 124, and free ends 126 of the portions 122*a-b* affix together with a fastener 128, such as a clamping bolt. The retainer or clamp 120 has an opening 125 with an internal shouldered profile defined therein. As discussed in more detail below, this internal shouldered profile in the opening 125 is configured to engage an external shouldered profile on the pin 110.

The one or more spacers 130, including the tensioning bolts 140 and the one or more spacer rings or washers 150, are used to adjustably space the clamp 120 relative to the second side of the crank arm 44. In effect, the tensioning bolts 140 and the one or more spacer washers 150 are used to adjust the tension on the wrist pin 110 by adjusting the tension between the clamp 120 and the second side of the crank arm 44, as discussed below.

Preferably, a plurality of the tensioning bolts 140 are arranged symmetrically about the opening 125 in the clamp 120 to adjust the clamp 120 relative to the side of the crank arm 44. For example, four or more of the bolts 140 can be used, but other implementations are possible. FIGS. 4A-4B and 5 show six such tensioning bolts 140. If necessary, one or more washers 150 can be used between the clamp 120 and the side of the crank arm 44. For example, FIG. 4B shows two washers 150 stacked on the wrist pin 110 between the clamp 120 and the crank arm's side. Such a washer 150 may not be needed in some installations.

Figure 6A:
FIGS. 6A-6B illustrate side views of wrist pins for the disclosed assembly.
Figure 6B:
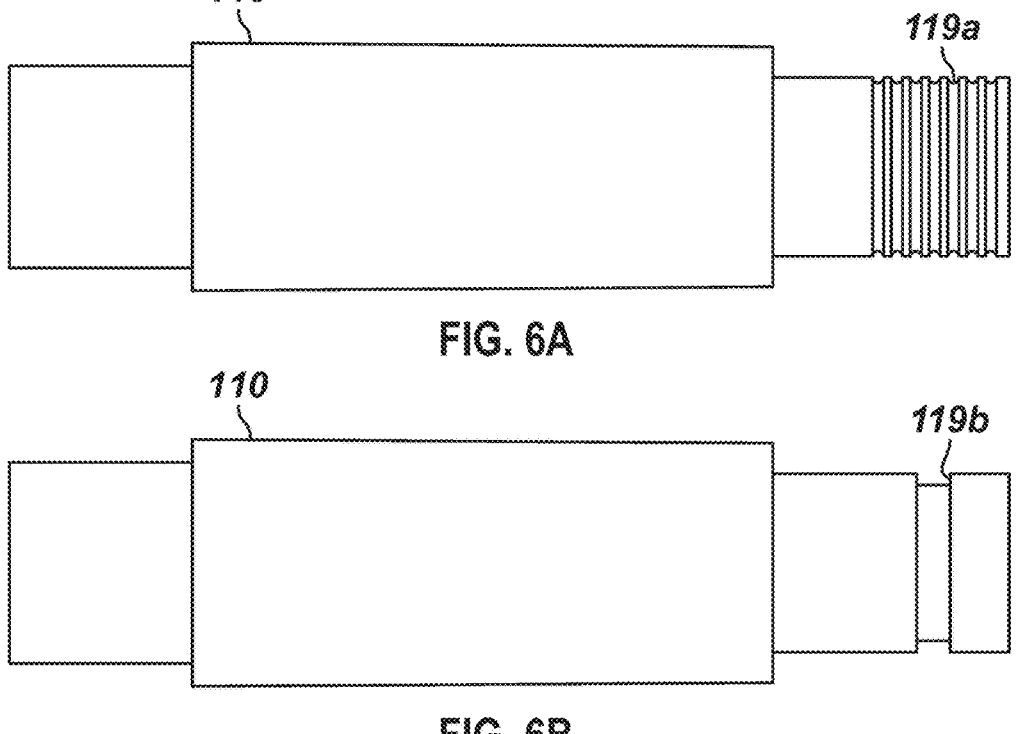

Examples of external shouldered profiles on the wrist pin 110 are shown in FIGS. 6A-6B. In FIG. 6A, the end 118 of the wristpin 110 includes a plurality of circumferential grooves 119*a*, ribs, ridges, shoulders, or the like disposed thereon. The grooves 119*a* are not spiraled and do not twist as a thread. In FIG. 6B, the end 118 of the wrist pin 110 includes a singular circumferential groove 119*b*, slots, shoulder, or the like disposed thereon.

Figure 7A:
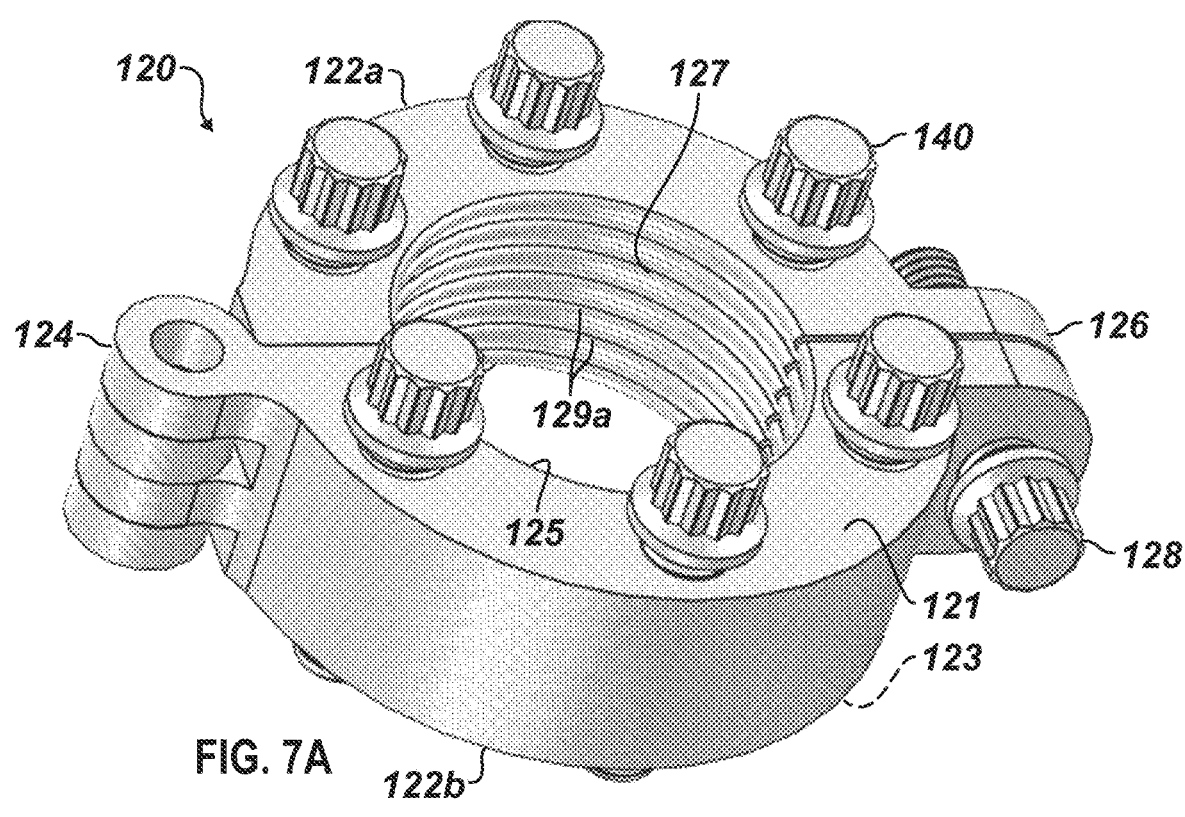
FIGS. 7A-7C illustrate side views of retainers for the disclosed assembly.
Figure 7B:
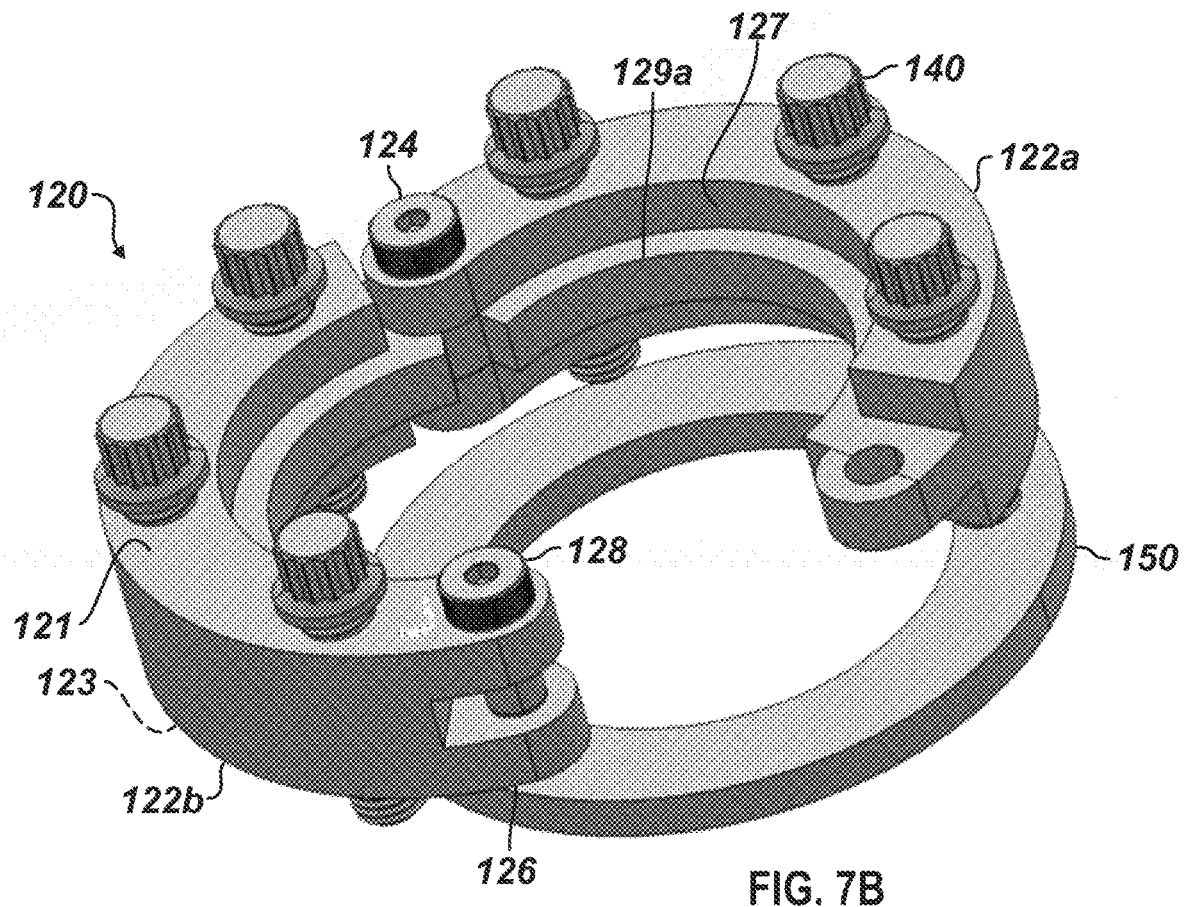
Figure 7C:
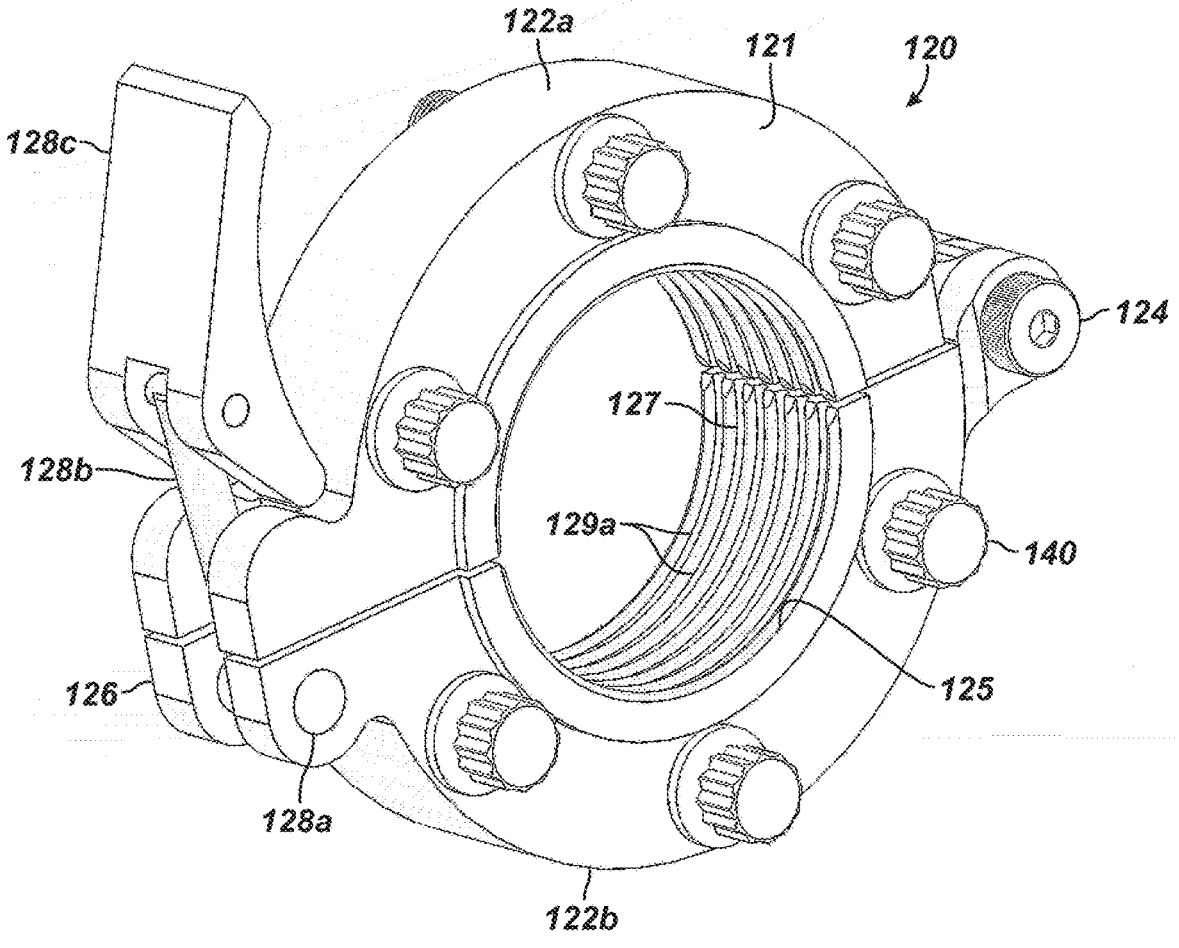

Examples of retainers or clamps 120 are shown in FIGS. 7A-7C. As shown in FIGS. 7A-7C, the clamp 120 has two portions or halves 122*a-b* connected by a hinge 124. Free ends 126 of the halves 122*a-b* affix together using a fastener or clamping bolt 128 to close the opening 125 in the clamp 120.

In FIG. 7A, an inside surface 127 of the clamp 120 has a uniform set of ridges 129*a* that match grooves (119*a*: FIG. 6A) on the wrist pin's end 118. Alternatively, the inside surface 127 of the clamp 120 shown in FIG. 7B has a single locking rib 129*b* that nests in a female counterpart (119*b*: FIG. 6B) on the wrist pin's end 118. For either of these configurations, the clamp 120 will not rotate off from the end 118 like a nut would when the retainer 120 is clamped on the wrist pin 110.

As noted, the clamp 120 is hinged on one side by a hinge 124 to allow the portions 122*a-b* of the retainer 120 to open. For example, the clamp 120 can include two halves 122*a-b*, but any number of portions can be used. As noted, a clamping bolt 128 locks the retainer's portions 122*a-b* together. The clamping bolt 128 can be either perpendicular as shown in FIG. 7A to provide additional clamping, or the bolt 128 can be parallel as in FIG. 7B with the retainer diameter.

In FIG. 7C, the clamp 120 has two portions or halves 122*a-b* connected by a hinge 124. Free ends 126 of the halves 122*a-b* affix together using a fastener 128*a-c* to close the opening 125 in the clamp 120. An inside surface 127 of the clamp 120 has a uniform set of ridges 129*a* that match grooves (119*a*: FIG. 6A) on the wrist pin's end 118. On this clamp 120, the fastener 128*a-c* is a clamping lever having a pivot pin or anchor 128*a*, an arm 128*b*, and a lever 128*c*. The pivot pin 128*a* is connected to the end 126 of one of the halves 122*b*, and the arm 128*b* is connected to the pivot pin 128*a*, which allows the arm 128*b* to pivot between forks on the ends 126 of the halves 122*a-b*. The pivot pin 128*a* can be fixed on the end 126, or it can be set in a forked slot of the end 126. The lever 128*c* is pivotably connected to the other end of the arm 128*b* and can fit against the other half 122*a* to clamp the two halves 122*a-b* together.

Once the clamp 120 disclosed herein in FIGS. 3 through 7C is clamped on the wrist pin 110, the tensioning bolts 140 on the periphery of the clamp 120 are tightened against the washer 150 if used. Alternatively, the tensioning bolts 140 can be tightened directly against the surface of the cam arm (44). The spacer bolts 140 help adjust the engagement of the clamp 120 against the surface of the cam arm 44 so that lateral slack can be made up on the wrist pin (110).

For installation, the clamp 120 is clamped onto the profiled end 118 of the of the wrist pin 110, and the clamping bolt 128 affixes the clamp 120 closed. The one or more spacers 130 are used to adjust the tension between the clamp 120 and the crank arm 44 for holding the wrist pin 110 in place. For instance, an initial washer 150 may or may not be installed on the end of the wrist pin 110 extending from the wrist pin hole 45' in the crank arm 44 before the clamp 120 is clamped on the wrist pin 110.

Tensioning bolts 140 are threaded on the clamp 120 to push against the washer 150 (or crank arm 44 if the washer 150 is not used). Torquing of the bolts 140 adjust the tension between the clamp 120 and the crank arm 44 for holding the wrist pin 110 in place. Yet, torquing of the bolts 140 may pull the wrist pin 110 further through the wrist pin hole 45', increasing a gap between the clamp 120 and the side of the crank arm 44. A given installation may be configured to have a maximum gap.

If the gap exceeds the maximum, the bolts 140 and the clamp 120 can be removed so another washer 150 can be installed on the end of the wrist pin 110 to decrease the spacing. For example, multiple washers 150 of the same or different thickness can be stacked on the wrist pin 110 to reduce the gap, or a single washer 150 of a designed thickness 150 can be used for a particular gap separation.

Once the one or more washers 150 are installed to reduce the gap, the process can be repeated in which the clamp 120 is clamped again on the profiled end 118 and the tensioning bolts 140 are torqued. The tensioning bolts 140 can be torqued with a ratchet wrench to a predetermined torque value that depends on the installation. The distribution of the torque values is preferably symmetric about the clamp 120, and the distal ends of the tensioning bolts 140 preferably extend equal distances from the front face 121 of the clamp 120 adjacent the washer(s) 150 (or the surface of the cam arm).

Preferably, a minimum gap is achieved between the clamp 120 and the one or more washers 150 (or the surface of the cam arm). In the installation process, different numbers of washers 150 or different thickness of washers 150 can be used, and tensioning bolts 140 of different lengths can be used as the gap is decreased. For example, shorter bolts 140 can be used for the reduced gap so that less of the bolts extend beyond the back face 123 of the clamp 120. As will be appreciated, other steps associated with a wrist pin bearing assembly can be performed during the installation process, and they are not detailed here.

Because the clamp 120 does not have threads engaging the wrist pin 110, the clamp 120 is not subject to galling. Moreover, corrosion is not expected to interfere with removal of the clamp 120. Additionally, the grooves, ribs, and other shoulders 119a-b, 129a-b on the wrist pin 110 and the clamp 120 do not have to be machined. Instead, they can be cast, thereby reducing the manufacturing costs. The clamp 120 is intended to be simple to install, is not intended to back out like a conventional nut, does not require an extremely large hammer wrench to install, and is cost effective.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An assembly connecting a pitman arm to a slot in a crank arm of a reciprocating pump unit, the crank arm having first and second sides, the pitman arm disposed on the first side and having a bearing, the assembly comprising:
   a pin having a proximal end and a distal end, the pin having the bearing of the pitman arm configured to rotate about the proximal end, the pin extending from the bearing of the pitman arm and positioned in the slot of the crank arm, the distal end of the pin extending from the second side of the crank arm, the distal end defining an external shouldered profile;
   a clamp clamped on the distal end of the pin, the clamp having a front face, a back face, and an internal shoulder profile, the clamp defining holes extending through the clamp from the back face to the front face, the front face positioned adjacent to the second side of the crank arm, the internal shouldered profile engaged with the external shouldered profile on the distal end of the pin;
   one or more spacer washers positioned on the distal end of the pin between the front face of the clamp and the second side of the crank arm; and
   a plurality of tensioning bolts threaded in the holes extending through the clamp from the back face to the front face, ends of the tensioning bolts engaged against an outermost one of the one or more spacer washers,
   wherein the clamp, the tensioning bolts, and the one or more spacer washers are configured to hold the pin in place relative to the slot of the crank arm; and
   wherein the tensioning bolts are adjustably threaded and the one or more spacer washers are selectively positioned to adjust tensioning of the pin relative to the crank arm.

2. The assembly of claim 1, wherein the one or more spacer washers comprise a plurality of spacer washers having a same or different thickness relative to one another.

3. The assembly of claim 1, wherein the external shouldered profile comprises one or more circumferential grooves defined about an external surface on the distal end of the pin; and wherein the internal shouldered profile comprises one or more circumferential ridges defined about an internal surface of the clamp and configured to fit in the one or more circumferential grooves.

4. The assembly of claim 1, wherein the clamp has at least two portions configured to enclose about a central passage, the at least two portions having connected ends and having free ends, the connected ends being connected together by a hinge, the free ends being configured to affix together.

5. The assembly of claim 4, comprising a fastener configured to affix the free ends together.

6. The assembly of claim 5, wherein the fastener is a clamp bolt; and wherein the free ends of the at least two portions of the clamp comprise openings configured to receive the clamp bolt therein.

7. The assembly of claim 6, wherein the openings to receive the clamp bolt extend parallel to or perpendicular to the central passage.

8. The assembly of claim 5, wherein the fastener is a clamping lever.

9. A reciprocating pump unit, comprising:
   pitman arms;
   an equalizer bar hingedly connected to the pitman arms;
   a walking beam hingedly connected to the equalizer bar and mounted to pivot on the reciprocating pump unit; and
   crank arms configured to translate the pitman arms, each of the crank arms having an assembly according to claim 1 connecting the pitman arm to a slot in the crank arm.

10. The assembly of claim 1, wherein the pin defines a taper from the proximal end to the distal end; and wherein the assembly further comprises an insert configured to install in the slot of the crank arm, the insert having a tapered bore in which the taper of the pin engages.

11. The assembly of claim 1, wherein the internal shouldered profile of the clamp is configured to position at any radial orientation on the external shouldered profile of the pin.

12. The assembly of claim 1, wherein the tensioning bolts comprise sets of the tensioning bolts having different lengths relative to one another.

13. A kit to connect a pitman arm to a slot in a crank arm of a reciprocating pump unit, the crank arm having first and second sides, the pitman arm disposed on the first side of the crank arm and having a bearing, the kit comprising:
   a pin having a proximal end and a distal end, the pin having the bearing of the pitman arm configured to rotate about the proximal end, the pin configured to extend from the bearing of the pitman arm and configured to position in the slot of the crank arm, the distal end of the pin being configured to extend from the second side of the crank arm, the distal end defining an external shouldered profile;
   a clamp configured to clamp on the distal end of the pin, the clamp having a front face, a back face, and an internal shoulder profile, the clamp defining holes extending through the clamp from the back face to the front face, the front face configured to position adjacent to the second side of the crank arm, the internal shouldered profile being configured to engage the external shouldered profile on the distal end of the pin; and a plurality of spacer washers, one or more of the spacer washers are configured to position on the distal end of the pin between the front face of the clamp and the second side of the crank arm; and a plurality of tensioning bolts threaded in the holes extending through the clamp from the back face to the front face, ends of the tensioning bolts engaged against an outermost one of the one or more spacer washers positioned on the distal end of the pin, wherein the clamp, the tensioning bolts, and the one or more spacer washers are configured to hold the pin in place relative to the slot of the crank arm; and wherein the tensioning bolts are adjustably threaded and the one or more spacer washers are selectively positioned to adjust tensioning of the pin relative to the crank arm.

14. The kit of claim 13, wherein the spacer washers have a same or different thickness relative to one another.

15. The kit of claim 13, wherein the tensioning bolts comprise sets of the tensioning bolts having different lengths relative to one another.

16. The kit of claim 13, wherein the external shouldered profile comprises one or more circumferential grooves defined about an external surface on the distal end of the pin; and wherein the internal shouldered profile comprises one or more circumferential ridges defined about an internal surface of the clamp and configured to fit in the one or more circumferential grooves.

17. The kit of claim 13, wherein the clamp has at least two portions configured to enclose about a central passage, the at least two portions having connected ends and having free ends, the connected ends being connected together by a hinge, the kit comprising a fastener configured to affix the free ends together.

18. The kit of claim 17, comprising a fastener configured to affix the free ends together.

19. The kit of claim 18, wherein the fastener is a clamp bolt; and wherein the free ends of the at least two portions of the clamp comprise openings configured to receive the clamp bolt therein.

20. The kit of claim 19, wherein the openings to receive the clamp bolt extend parallel to or perpendicular to the central passage.

21. The kit of claim 18, wherein the fastener is a clamping lever.

22. The kit of claim 13, wherein the internal shouldered profile of the clamp is configured to position at any radial orientation on the external shouldered profile of the pin.

23. The kit of claim 13, wherein the pin defines a taper from the proximal end to the distal end; and wherein the kit further comprises an insert configured to install in the slot of the crank arm, the insert having a tapered bore in which the taper of the pin engages.

24. A method to connect a pitman arm to a slot in a crank arm of a reciprocating pump unit, the method comprising:

positioning a pin extending from a bearing of the pitman arm on a first side of the crank arm into the slot in the crank arm, the pin having a proximal end and a distal end, the proximal end having the bearing of the pitman arm configured to rotate thereabout, the distal end of the pin extending from a second side of the crank arm;

clamping a clamp on the distal end of the pin exposed on the second side of the crank arm by engaging an internal shouldered profile on the clamp to an external shouldered profile on the distal end of the pin; and holding the pin in place relative to the slot of the crank arm and tensioning the pin relative to the crank arm by:

selectively positioning one or more spacer washers on the distal end of the pin between the second side of the crank arm and a front face of the clamp; and adjustably threading a plurality of tensioning bolts extending from a back face of the clamp to the front face to engage ends of the tensioning bolts against an outermost one of the one or more spacer washers.

25. The method of claim 24, wherein engaging the internal shouldered profile to the external shouldered profile comprises engaging one or more circumferential grooves defined about the distal end of the pin in one or more circumferential ridges defined about an inside surface of the clamp.

26. The method of claim 24, wherein the pin defines a taper from the proximal end to the distal end; and wherein the method comprises, before positioning the pin into the slot, fitting a sleeve in the slot of the crank arm, the sleeve having a tapered bore against which the taper of the pin engages.

27. The method of claim 24, wherein clamping the clamp on the distal end of the pin comprises closing at least two portions connected by a hinge on the clamp about the distal end of the pin; fitting the internal shouldered profile on an inside surface of the at least two portions to the external shouldered profile; and affixing free ends of the at least two portions together.

28. The method of claim 24, wherein engaging the internal shouldered profile on the clamp to the external shouldered profile on the distal end of the pin comprises engaging the internal shouldered profile on the clamp at any radial orientation to the external shouldered profile on the distal end of the pin.

* * * * *